United States Patent [19]

Brannen

[11] 4,043,629

[45] Aug. 23, 1977

[54] RADIO-ANTENNA WALL PLATE ASSEMBLY

[75] Inventor: H. David Brannen, Carroll, Iowa

[73] Assignee: DB Electronics, Inc., Carroll, Iowa

[21] Appl. No.: 736,696

[22] Filed: Oct. 29, 1976

[51] Int. Cl.$^2$ ........................ H01R 17/18; H02B 1/02

[52] U.S. Cl. ............................. 339/126 J; 339/177 E

[58] Field of Search ............... 339/119 R, 122 R, 125, 339/126, 132 R, 177 E, 177 R, 94 A, 94 C, 89 C, 130 R, 130 C, 217 J

[56] References Cited

U.S. PATENT DOCUMENTS

| | | | |
|---|---|---|---|
| 2,422,982 | 6/1947 | Quackenbush | 339/89 C X |
| 3,372,364 | 3/1968 | O'Keefe | 339/177 |
| 3,622,945 | 11/1971 | Winston et al. | 339/122 X |

*Primary Examiner*—Roy Lake
*Assistant Examiner*—E. F. Desmond
*Attorney, Agent, or Firm*—Zarley, McKee, Thomte, Voorhees & Sease

[57] ABSTRACT

A coaxial coupling member is integrally connected to a wall plate detachably connected to a wall bracket in turn connected to the room wall across an opening in the wall. The bracket connection to the wall and the wall plate is along the axial center while the center of the bracket is displaced from the center by being arcuate. The coupling member may have a conductor sleeve through the center and external threads for both ends for connection to a coupling nut on radio and antenna cables or the antenna end of the coupling member may be permanently connected to the antenna cable by the conductor of the cable being soldered to the conductor sleeve and the braid on the cable being connected to the coupling member by a terminal having an eye on the antenna end of the coupling member and the braid being received in a sleeve lug on the terminal.

8 Claims, 7 Drawing Figures

RADIO-ANTENNA WALL PLATE ASSEMBLY

BACKGROUND OF THE INVENTION

Nonmobile transmission of a signal between a radio and an antenna requires placement of an antenna on the outside of the building with a coaxial cable running from the antenna to the room in which the radio is located. This is true for citizen band radios (CB), FM radio or ham radio operation. It may be desirable to feed the signal between the antenna and several rooms having radio transmitter and receiver units. It may also be desirable to only temporarily connect the radio unit to the antenna and preferably the connection should be at the wall rather than on the radio unit. Accordingly, a wall type radio-antenna coupling unit is desirable.

SUMMARY OF THE INVENTION

The radio-antenna wall plate assembly of this invention allows a transmitter-receiver radio unit or the like to be detachably connected to the antenna outside the building by a wall plate connection in the wall of the room where the radio unit is located.

The coupling unit may include a wall plate having integrally connected to it a coupling member having external threads and a conductor coaxial sleeve for connection to radio and antenna coaxial cables having coupling nuts. A coupling member is secured to the wall plate by threaded nuts on opposite sides of the plate. Alternatively, the antenna coaxial cable may be permanently connected to the coupling member by the center conductor being soldered to the coupling member sleeve and the braid being connected to a lug sleeve on a terminal positioned on the coupling member. A nut holds the coupling member to the wall plate and holds the terminal in place on the coupling member.

The mounting of the wall plate to the wall is accomplished through use of a wall bracket having its outer ends secured by bolt means to the wall with the center portion of the bracket being arcuate to leave open the center of the wall opening for passage of the antenna cable to be connected to the coupling member on the wall plate. Screw means connect the wall plate to the wall bracket inwardly of the bracket's connection to the wall.

DESCRIPTION OF THE PREFERRED EMBODIMENT

Figure 2:
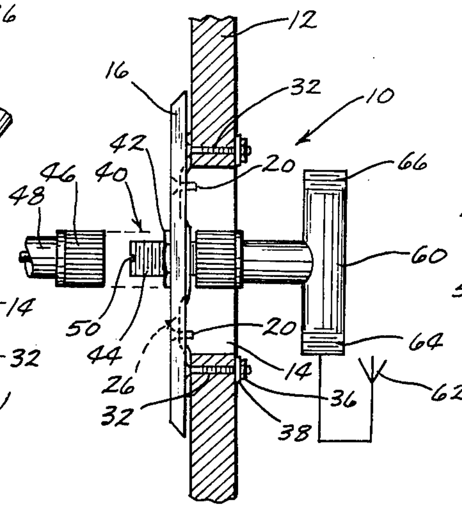
FIG. 2 is a elevational cross-sectional view of the wall plate assembly and further showing the radio cable and T coupling member.

The radio-antenna wall plate assembly of this invention is referred to in FIG. 2 generally by the reference numeral 10 and is shown mounted on a room wall 12 having an opening 14. The opening may preferably be 2¾ inches × 1¾ inches.

The wall plate assembly 10 includes a wall plate 16 larger in size than the opening 14 and including oppositely disposed holes 18 through which mounting screws 20 extend for connection to threaded openings 22 aligned with the wall hole 14 in a wall bracket 26. The wall bracket 26 includes straight end portions 28 and an arcuate intermediate portion 30. Mounting bolts 32 extend through the outer ends 28 of the wall bracket and extend through wall holes outwardly of the wall opening 14. Nuts and washers 36 and 38 respectively, are provided on the ends of the bolts 32 for securing the wall bracket 26 to the wall 12, as seen in FIG. 2.

Figure 1:
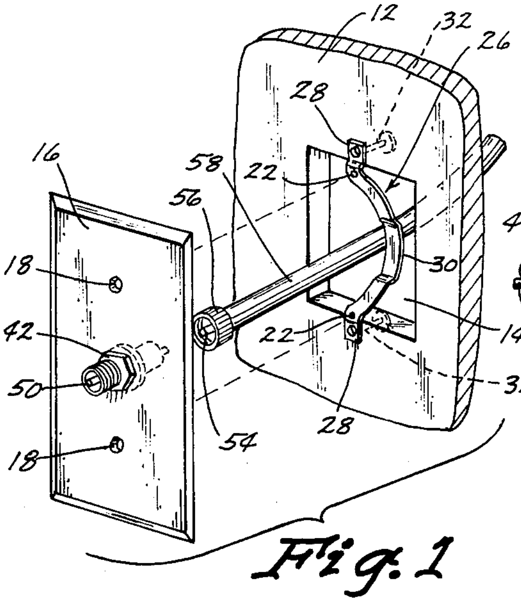
FIG. 1 is a fragmentary exploded perspective view of the radio-antenna wall plate assembly of this invention wherein both ends of the coupling member on the wall plate are externally threaded for connection to radio and antenna coupling nuts.
Figure 3:
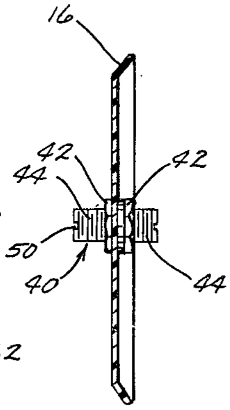
FIG. 3 is a elevational cross-sectional view of only the wall plate assembly.
Figure 4:
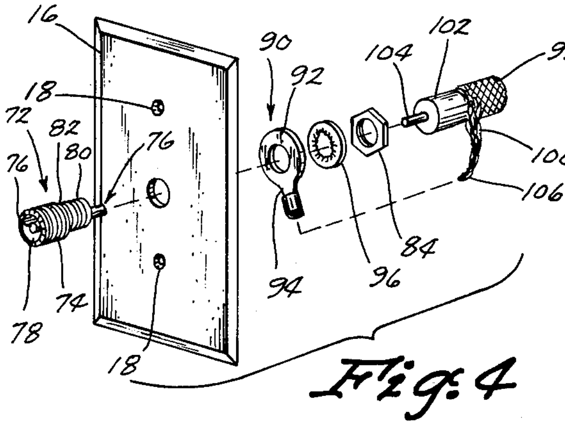
FIG. 4 is an exploded perspective view of an alternate embodiment of this invention showing the antenna cable permanently connected to the coupling member.

A coupling member 40 is integrally connected to the wall plate 16 at its axial center by oppositely disposed nuts 42 engaging the opposite faces of the wall plate as best seen in FIG. 3. A coupling member 40 is provided with external threads 44 on each end for engagement by a coupling nut such as the coupling nut 46 on a radio cable 48, as seen in FIG. 2. An axial female sleeve 50 is provided in the coupling member 40 to receive the male conductor in a coupling nut such as the male conductor 54 in the coupling nut 56 on the antenna cable 58, as seen in FIG. 1.

As seen in FIG. 2, a T-coupling 60 may be connected to the antenna end 44 of the coupling member 40 to allow for an antenna 62 to be connected to one leg 64 of the T while the other leg 66 is available for being connected to another wall plate assembly 10 (not shown) in another room for connecting another radio to the antenna 62.

The wall bracket 26 having the arcuate configuration allows for the center of the wall opening 14 to remain open and thus provide direct access for the antenna cable 58 when being connected to the antenna end 44 of the coupling member 40 which is positioned in the center of the wall opening 14 when the wall plate 16 is mounted on the wall 12. An apparent advantage of the unit of FIGS. 1 - 3 is that both the radio cable 48 and the antenna cable 58 can be quickly connected and disconnected through operation of the coupling nuts such as the nut 46 on the radio cable 48.

Figure 5:
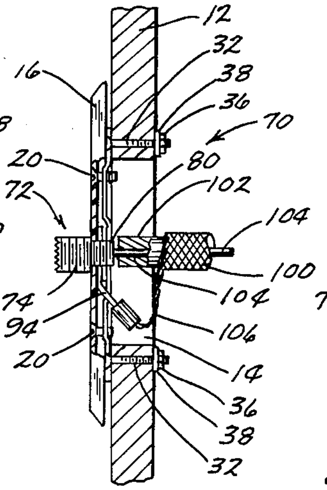
FIG. 5 is a elevational cross-sectional view showing the wall plate assembly mounted on a room wall.
Figure 6:
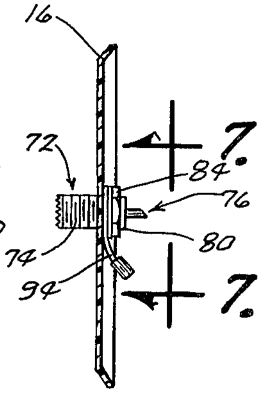
FIG. 6 is a elevational cross-sectional view of only the wall plate assembly.
Figure 7:
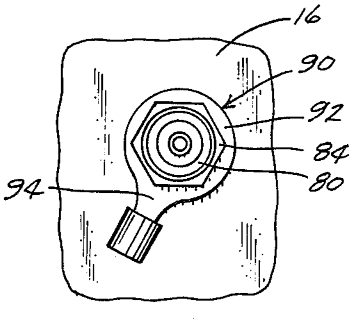
FIG. 7 is a view taken along line 7 — 7 in FIG. 6.

An alternate embodiment of the wall plate assembly is shown in FIGS. 4 - 7 and is referred to generally by the reference numeral 70 in FIG. 5. The wall plate 16 is connected to the wall 12 and through the bracket 26 in the same manner as the unit shown in FIGS. 1 - 3. A modified coupling member is illustrated which allows for a detachable radio cable to be connected while a antenna cable is permanently connected.

A coupling member 72 includes an end portion 74 having external threads. A conductor sleeve 76 extends through the coupling member 74 and is surrounded by insulation 78. The opposite end 80 of the coupling member 72 is smaller in diameter than the end 74 and thus provides a shoulder 82 for engagement with the face of the wall plate 16. A nut 84 on the end 80 locks the coupling member 72 to the wall plate 16.

A ground terminal 90 having an eye 92 and a lug sleeve 94 is provided on the coupling member end 80 and is held tight by the nut 84 engaging a washer 96 between the nut and the terminal.

The antenna cable 98 includes an outer braid 100 over insulation 102 on a coaxial conductor wire 104. The braid 100 is formed into a wire 106 which in turn is placed in the lug sleeve 94 and then crimped, as seen in FIG. 5. The conductor wire 104 is received in the conductor sleeve 76 and is then soldered to complete the connection.

Accordingly, it is seen that the unit of FIGS. 1 – 3 allows for quick connect and disconnect of the radio and antenna cables 48 and 58, respectively. The assembly 70 in FIGS. 4 – 7 permit the radio cable to be detachably connected to the coupling member 72 while the antenna cable 98 is permanently connected to the end 80 of the coupling member. The wall plate 16 is connected to the wall 12 in the same manner in both embodiments and specifically through use of the arcuate wall bracket 26.

I claim:

1. A radio-antenna wall plate assembly for coaxial cable comprising, a cover wall plate for the room side of a wall opening, a wall bracket for connecting the wall plate to a room wall, and a coupling member integrally connected to said wall plate and having opposite ends on opposite sides of said plate for interconnecting radio and antenna cables.

2. The structure of claim 1 wherein said wall bracket is adapted to extend across a wall opening and be secured to said room wall by bolt means and screw means connecting said wall plate to said wall bracket.

3. The structure of claim 2 wherein said wall bracket includes screw openings for said screw means positioned inwardly of said bolt means and adapted to be in alignment with a wall opening.

4. The structure of claim 3 wherein said wall bracket is arcuate along its length and adapted to extend to one side of the center of a wall opening thereby providing access to said coupling member positioned at the center of said axial opening, and said wall bracket opposite ends are adapted to be connected to said room wall and said wall plate along a line extending through the center of said plate and a wall opening.

5. The structure of claim 1 wherein said coupling member is positioned in a hole in said wall plate and nut means on said member clamps said wall plate therebetween.

6. The structure of claim 1 wherein the opposite ends of said coupling member are externally threaded and include a coaxial conductor sleeve.

7. The structure of claim 1 wherein the end of said coupling member on the room side of said wall plate is externally threaded and includes a coaxial conductor sleeve, and the wall side of said coupling member includes an axial conductor sleeve and a terminal having a sleeve and an eye is positioned with said eye on said other end of said coupling member and locked against relative movement by a nut means thereby providing an electrical ground connection for an antenna cable wherein the braid on the cable is adapted to be connected to said terminal sleeve.

8. The structure of claim 7 wherein the one end of said coupling member is larger in diameter than the other end and an opening through said wall plate whereby an annular shoulder is formed at the juncture of said coupling member end portions and said shoulder is in engagement with the room side of said wall plate.

* * * * *